(12) United States Patent
Abraham et al.

(10) Patent No.: US 11,428,568 B2
(45) Date of Patent: Aug. 30, 2022

(54) METHOD FOR DETERMINING A REMAINING EMPTY VOLUME, METHOD FOR ON-SITE CALIBRATION OF A FILL LEVEL MEASURING DEVICE, AND ON-SITE CALIBRATION MODULE

(71) Applicant: Endress+Hauser Group Services AG, Reinach (CH)

(72) Inventors: Jürgen Abraham, Hörup (DE); Stefan Brändlin, Weil am Rhein (DE); Torsten Thiel, Retgendorf (DE)

(73) Assignee: Endress+Hauser Group Services AG, Reinach (CH)

( * ) Notice: Subject to any disclaimer, the term of this patent is extended or adjusted under 35 U.S.C. 154(b) by 0 days.

(21) Appl. No.: 17/268,674

(22) PCT Filed: Aug. 16, 2019

(86) PCT No.: PCT/EP2019/071985
§ 371 (c)(1),
(2) Date: Feb. 16, 2021

(87) PCT Pub. No.: WO2020/035582
PCT Pub. Date: Feb. 20, 2020

(65) Prior Publication Data
US 2022/0057251 A1    Feb. 24, 2022

(30) Foreign Application Priority Data

Aug. 16, 2018  (DE) .................... 10 2018 119 951.1

(51) Int. Cl.
*G01F 23/14*  (2006.01)
*G01F 25/20*  (2022.01)
*G01F 17/00*  (2006.01)

(52) U.S. Cl.
CPC .............. *G01F 25/20* (2022.01); *G01F 17/00* (2013.01); *G01F 23/14* (2013.01)

(58) Field of Classification Search
CPC ....... G01F 25/0061; G01F 17/00; G01F 23/14
See application file for complete search history.

(56) References Cited

U.S. PATENT DOCUMENTS

| 3,744,306 A | 7/1973 | Krueger |
| 6,038,919 A * | 3/2000 | Schmitt ................... G01F 23/14 73/149 |

(Continued)

FOREIGN PATENT DOCUMENTS

| DE | 102004027336 A1 | 12/2005 | |
| DE | 102015106187 A1 * | 10/2016 | ......... G01F 25/0061 |

(Continued)

*Primary Examiner* — Herbert K Roberts
(74) *Attorney, Agent, or Firm* — Mark A. Logan; Endress+Hauser (USA) Holding, Inc.

(57) ABSTRACT

Disclosed is a method for determining a remaining empty volume in a container, comprising: measuring a first pressure initially prevailing in the container; feeding in a gaseous pressure-boosting medium through an inlet, into the container; measuring the increased second pressure; determining the pressure increase caused by the infeeding of the pressure-boosting medium; determining a volume of the pressure-boosting medium that has been fed into said container; measuring a temperature prevailing in the container; and determining the remaining empty volume on the basis of the pressure increase, the volume of the pressure-boosting medium, and the temperature. Disclosed also is a method for on-site calibration of a fill-level measuring device in which the volume of the medium in the container is determined on the basis of the method for determining a remaining empty volume, and an on-site calibration module.

5 Claims, 2 Drawing Sheets

(56) References Cited

U.S. PATENT DOCUMENTS

| | | | |
|---|---|---|---|
| 7,347,089 B1 | 3/2008 | Kelley et al. | |
| 2006/0181450 A1* | 8/2006 | Klees | H01Q 1/225 |
| | | | 342/124 |
| 2016/0054170 A9 | 2/2016 | Harper et al. | |
| 2016/0061646 A1* | 3/2016 | Mestivier | G01F 23/14 |
| | | | 73/1.73 |
| 2016/0193615 A1 | 7/2016 | Schmid et al. | |
| 2017/0038238 A1 | 2/2017 | Nguyen et al. | |

FOREIGN PATENT DOCUMENTS

| | | |
|---|---|---|
| JP | 62237323 B2 | 10/1987 |
| JP | 11506539 A | 6/1999 |
| WO | 9530131 A1 | 11/1995 |
| WO | 9826257 A1 | 6/1998 |
| WO | 2017016779 A1 | 2/2017 |
| WO | 2017075153 A1 | 5/2017 |

* cited by examiner

METHOD FOR DETERMINING A REMAINING EMPTY VOLUME, METHOD FOR ON-SITE CALIBRATION OF A FILL LEVEL MEASURING DEVICE, AND ON-SITE CALIBRATION MODULE

CROSS-REFERENCE TO RELATED APPLICATIONS

The present application is related to and claims the priority benefit of German Patent Application No. 10 2018 119 951.1, filed on Aug. 16, 2018, and International Patent Application No. PCT/EP2019/071985 filed on Aug. 16, 2019, the entire contents of which are incorporated herein by reference.

TECHNICAL FIELD

The invention relates to a method for determining a remaining empty volume in a container provided for receiving a process medium and which can be closed pressure-tight, to a method for the on-site calibration of the fill-level measuring device, and to an on-site calibration module.

BACKGROUND

Fill-level measuring devices are used as field devices in industrial process systems in automation engineering. Field devices in general refer to all measuring devices for determining and/or monitoring process variables which are used near the process and which supply or process process-relevant information. Such field devices are manufactured and sold by the Endress+Hauser group in a wide variety of designs and are used in automation engineering for determining and/or monitoring process variables of a process medium. The process medium is for example a flowing medium, in particular a fluid in the case of a liquid and/or gaseous process medium.

The fill-level measuring device is for example a transit time fill-level measuring device. With transit time fill-level measuring devices, a transmission signal is emitted by a transmitter in order to determine the fill level of a medium in a container, and an echo signal is formed by reflecting the transmission signal from the surface of the medium, and is received and evaluated by a receiver. The transit time of the transmission signal and echo signal is a measure of the fill level. For example, transit time fill-level measuring devices are known which operate with microwaves (such as radar) or other electromagnetic waves. Transit time fill-level measuring devices that operate with ultrasonic waves are also known.

Alternatively, the fill-level measuring device is, for example, a fill-level measuring device operating with hydrostatic pressure which determines the fill level of the process medium by means of two pressure gauges mounted at different heights of the container. Other fill-level measuring devices known from the prior art and fill-level measuring devices relevant within the scope of the invention include for example fill-level measuring devices operating with load cells, or capacitively and/or conductively operating fill-level measuring devices.

Such fill-level measuring devices are described in numerous patent applications of the applicant.

The volume of the process medium held in the container is often determined from the fill level of the process medium in the container as detected by the fill-level measuring device. This constitutes for example a control and/or regulating variable which is relevant to process control and/or regulation.

One possibility is to determine the volume of the process medium from the fill level using a predetermined container geometry. However, this method is limited in its accuracy in that, for example, fittings in the container, such as agitators, influence the volume that can actually be occupied by the medium. In particular in the pharmaceutical, chemical and/or food-processing industries, due to high safety requirements a very precise knowledge of the volume of the process medium actually present in the container is often required. For this reason, in this context, generally before starting the process, a test medium with a known volume flows into the container, and a measured value displayed by the fill-level measuring device is determined and correlated with the known volume. A calibration curve Vmed(L) is ascertained from the correlation of such different volume/fill level value pairs and, for example, saved in a control/evaluation unit in order to convert the fill level ascertained by the fill-level measuring device into a volume on the basis of the calibration curve Vmed(L) during subsequent operation. The inflow of the test medium and the creation of such a calibration curve are often referred to in the prior art as so-called "linearization", wherein the relationship between fill level and volume can of course also be non-linear depending on the container geometry and/or design of container fittings. Due to the hygiene requirements in the aforementioned industries, especially purified water, for example, is generally used as the test medium during linearization, such as water for injection purposes (water for injection, in short: WFI).

Since a fill-level measuring device is subject to a drift process due to aging, it must be calibrated, verified and/or adjusted after a predetermined period of use, for example at regular, specified intervals in order to comply with specified safety requirements in the aforementioned industries. Calibration is usually understood to mean the establishment of a deviation of a first measured value measured by the fill-level measuring device from an alternatively determined reference value which is assumed to be correct. The verification also comprises the determining of the deviation and its assessment or evaluation. Adjustment is understood to mean adapting the fill-level measuring device in such a way that its displayed measured value coincides with the reference value assumed to be correct. In the prior art the fill-level measuring device, which is often fixedly attached to the container, must be removed for calibration, verification and/or adjustment. Alternatively or in addition, as in the aforementioned linearization, a known volume of a test medium flows into a completely emptied container, the displayed fill level of the fill-level measuring device is read, and a volume of the test medium is determined with the initially determined and saved calibration curve. Depending on the industry, the aforementioned WFI water, which is generally very expensive, is often used as the test medium. The comparison between the known volume of the test medium and the volume determined with the fill-level measuring device is then used for calibrating, verifying and/or adjusting the fill-level measuring device. It is disadvantageous that both methods for calibration, verification and/or adjustment are associated with very long downtimes. As a rule, these cause high costs due to the associated production outages.

The aim of the invention is therefore to present a possibility for calibrating, verifying and/or adjusting a fill-level measuring device with less downtime.

SUMMARY

The object is achieved by a method for determining a remaining empty volume, a method for the on-site calibration of a fill-level measuring device, and by an on-site calibration module.

With regard to the method for determining a remaining empty volume, the object is achieved using a method by means of which the remaining empty volume is determined in a container provided for receiving a process medium and which can be closed pressure-tight, wherein the remaining empty volume is a residual volume of the container which can be occupied by a medium, in particular the process medium or a cleaning medium, comprising at least the steps:
  measuring a first pressure p0 initially present in the container;
  a gaseous pressure-boosting medium flows through an inlet into the container, wherein the pressure-boosting medium flowing into the container occupies the remaining empty volume, and the initially present pressure is increased to an increased pressure;
  measuring the increased pressure ph;
  determining the pressure increase $\Delta p = ph - p0$ caused by the inflow of the pressure-boosting medium;
  determining a volume of the pressure-boosting medium flowing into the container;
  measuring a temperature present in the container;
  determining the remaining empty volume from the pressure increase $\Delta p$, the volume of the pressure-boosting medium, and the temperature.

In one embodiment of the method, the remaining empty volume is determined as follows from the pressure increase, the volume of the pressure-boosting medium, the temperature, and also from a specifiable reference temperature and a specifiable reference pressure:

$$V_{leer} = V_{Mtest} \cdot \frac{T + Tn}{Tn} \cdot \frac{pn}{\Delta p + pn}$$

In the above formula, V_leer denotes the remaining empty volume, $\Delta p$ the pressure increase, V_Mtest the volume of the pressure-boosting medium, and T the temperature. Tn is the specifiable reference temperature and pn is the specifiable reference pressure, for example a standard temperature and a standard pressure. Examples of a standard temperature and standard pressure are 273.15° Kelvin and 1013.25 hectopascal (hPa), respectively.

In one development of the method, this comprises the following steps:
  continuously measuring a volume flow rate of the pressure-boosting medium during the inflow of the pressure-boosting medium through the inlet into the container by means of a flowmeter attached to the inlet, in particular by means of a Coriolis flowmeter;
  determining the volume of the pressure-boosting medium flowing into the container by means of the measured volumetric flow rate during the inflow.

The volume of the pressure-boosting medium introduced into the container is determined by calculating the balance of the pressure-boosting medium flowing through the inlet into the container by using the flowmeter. The accuracy of the method for determining the remaining empty volume is influenced by the accuracy of the measurement of the temperature, pressure and volume of the pressure-boosting medium. The use of a Coriolis meter as the flowmeter is advantageous due to its high accuracy. Of course, the use of other flowmeters known from the prior art, such as ultrasound flowmeters, thermal flowmeters, magnetically inductive flowmeters, etc. is also possible.

In one embodiment of the method, this comprises the following steps:
  specifying a specifiable target pressure and/or a specifiable target pressure increase;
  transmitting the measured, initially present first pressure to a control/evaluation unit configured to actuate a valve unit;
  measuring more-or-less continuously during the inflow of the present, increased second pressure, and transmitting the measured, increased second pressure to the control/evaluation unit;
  controlling the valve unit by the control/evaluation unit in such a way that the pressure-boosting medium flows into the container until the increased second pressure reaches the specified pressure, and/or until the pressure increase reaches the specified pressure increase.

The valve unit comprises in particular at least one valve which can be controlled by the control/evaluation unit. In this case, this therefore constitutes a pressure-controlled regulation. Once the target pressure and/or target pressure increase has been reached, the inlet is closed by the valve unit. The valve unit which can be controlled by the control/evaluation unit is arranged for this purpose for example adjacent to the flowmeter, preferably with respect to the inflow direction of the pressure-boosting medium upstream of the flowmeter. Pressure-boosting medium which flows through the flowmeter and is thus taken into account when calculating the balance of the volume of the pressure-boosting medium, is thereby also conducted into the container in each case.

Alternatively, it is also possible to carry out volume-controlled regulation of the method. In one alternative embodiment of the method, this therefore comprises the following steps:
  specifying a specifiable target volume of the pressure-boosting medium;
  more-or-less continuously delivering the volume of the inflowing pressure-boosting medium measured by the flowmeter to the control/evaluation unit during the inflow;
  controlling the valve unit by the control/evaluation unit in such a way that the pressure-boosting medium flows into the container until the measured volume reaches the specifiable target volume.

In a further development of the method, the steps of the method are carried out with a container in which a medium, in particular a cleaning medium or the process medium, is located so that the remaining empty volume (V_leer) for the container filled with medium is determined, and wherein the volume of the medium in the container (Vmed) is determined using a difference between a total empty volume (V_gesleer) in the empty container that can be assumed by a medium, in particular by the process medium or a cleaning medium, and the remaining empty volume (V_mleer) for the container filled with medium:

$$V\text{med} = V\_gesleer - V\_mleer$$

The volume of the medium Vmed in the container filled with medium corresponds to the remaining empty volume V_mleer apart from the plus/minus sign, and a constant displacement by a total empty volume which can be assumed by the medium. In order to obtain the volume of the medium Vmed in the container, the remaining empty volume V_mleer is thus subtracted from the total empty volume. The particular advantage of this development is that the volume of the medium in the container is determined without it having to be drained from the container.

The constant displacement can be determined for example once, especially when starting the fill-level measuring device. In a development of the method, the steps of the method are carried out using an empty container, wherein the remaining empty volume of the empty container determined in the process is determined as the total empty volume in the empty container which can be assumed by a medium, in particular by the process medium or by a cleaning medium.

With regard to the method for calibrating a fill-level measuring device on site, the object is achieved by a method for the on-site calibration of a fill-level measuring device which is designed to determine and/or monitor a fill level of a medium in the container, in particular a process medium or cleaning medium, which is in particular a fill-level measuring device that operates contactlessly, comprising at least the steps of:
  determining the volume of the medium in the container using the method according to the invention for determining the remaining empty volume;
  measuring the fill level of the medium in the container by the fill-level measuring device;
  determining a volume of the medium in the container by the fill-level measuring device using an in particular initially determined, saved relation between the fill level measured with the fill-level measuring device and a volume of the medium in the container dependent on the fill level;
  establishing, documenting and/or displaying at least the difference between the volume of the medium in the container determined by the fill-level measuring device and the volume of the medium in the container determined using the method for determining the remaining empty volume.

In the method for the on-site calibration of the fill-level measuring device, the volume of the medium in the container is thus determined a first time by means of the method for determining a remaining empty volume and is used as a reference volume for the volume of the medium in the container, and is determined a second time using the fill-level measuring device. When calibrating, verifying and/or adjusting the fill-level measuring device, the value ascertained with the fill-level measuring device is then used with the reference volume.

To convert the fill level indicated by the fill-level measuring device into a volume, the aforementioned initially determined relation Vmed(L), that was in particular saved in the control/evaluation unit, between the fill level measured with the fill-level measuring device and the volume of the medium in the container dependent on the fill level, is used. In particular, as mentioned above, this relation is initially determined by adding a test medium of known volume to the container, for example before starting the fill-level measuring device, in order to correlate the fill level indicated by the fill-level measuring device (initially assumed to be correct) with the known volume, and to determine a calibration curve therefrom. This calibration curve is assumed to be constant so that a deviation occurring during later operation between the volume determined with the fill-level measuring device and the volume ascertained by the method for determining the remaining empty volume in the container is attributed to a drift of the fill-level measuring device.

The advantages of the method for the on-site calibration of the fill-level measuring device are as follows:
  as mentioned above, the medium may remain in the container while the volume of the medium is being determined. The method for the on-site calibration of the fill-level measuring device can thereby be integrated very easily into an existing process. The volume of the medium in the container can be determined, for example, during a comparatively short interruption of the process. This holds true especially in comparison to an interruption in which the container must be emptied through an inlet to calibrate the fill-level measuring device in order to then conduct a test medium with a known volume into the container, for example a flowmeter attached to the inlet.
  a drift of the fill-level measuring device can be determined without its removal. The fill-level measuring device can thus remain in its arrangement close to the process for calibration, verification and/or adjustment, for example in its installation position in the event that it is mounted on the container.

In the prior art as mentioned above, relatively expensive WFI water is also used as the test medium for recalibrating the fill-level measuring device. The method according to the invention for the on-site calibration of the fill-level measuring device does not require such a test medium, but only the pressure-boosting medium. This is subject to less stringent requirements so that substantially more affordable media can be used as a pressure-boosting medium in the method according to the invention, for example $CO_2$ or even ambient air depending on the embodiment.

In an embodiment of the method for the on-site calibration of the fill-level measuring device, the method comprises the step of:
  adjusting the fill-level measuring device, wherein the measured value of the fill-level measuring device is adapted such that the volume of the medium in the container ascertained using the fill-level measuring device matches the volume of the medium in the container ascertained by the method for determining the remaining empty volume.

In a development of the method for the on-site calibration of the fill-level measuring device, ambient air or a high-purity gas, in particular purified ambient air or $CO_2$ is used as the pressure-boosting medium. The choice of pressure-boosting medium is determined, for example, by what type of medium is involved. If it is for example cleaning medium, there are basically no requirements for the pressure-boosting medium. If it is process medium, it should be ensured that the pressure-boosting medium does not adversely interact with the process medium. In the aforementioned industries, $CO_2$ for example may be used as the pressure-boosting medium for numerous process media.

In an embodiment of the method for the on-site calibration of the fill-level measuring device, a pressurized gas cylinder or a compressed air system of a process installation is used during the inflow of the pressure-boosting medium in which the on-site method for calibrating a fill-level measuring device is carried out. The pressurized gas cylinder then contains, for example, the selected pressure-boosting medium. If, depending on the embodiment of the method, there are essentially hardly any demands on the purity of the pressure-boosting medium, the compressed-air system of the processing system that frequently already exists can advantageously also be used, and purified or unpurified ambient air can be used.

In a particularly advantageous embodiment of the method for the on-site calibration of the fill-level measuring device, the fill-level measuring device is calibrated on site after a cleaning of the container with a cleaning medium, wherein the cleaning medium serves as the medium used in on-site calibration,
and wherein the container is steam-sterilized in particular after the on-site calibration of the fill-level measuring device.

In this embodiment, the method for on-site calibration is very advantageously integrated into existing processes, since in the aforementioned industries, such so-called "cleaning in place" (or CIP cleaning for short) with cleaning medium must occur at regular intervals in any case. In the event that steam-sterilization of the container follows on-site calibration, there are basically no restrictions on the type of pressure-boosting medium.

In a further embodiment of the method, the pressure-boosting medium is then drained from the container, for example by opening a valve unit in the container. As a result, the increased pressure generated in the method for determining the remaining empty volume is at least partially reduced.

In one embodiment of the method, an incompressible medium is used which thus retains its volume even under the increased pressure in the method for the on-site calibration of the fill-level measuring device. Whether this is the case can be checked by whether the fill level displayed by the fill-level measuring device remains basically constant during the execution of the method.

If on the other hand the fill level displayed by the fill-level measuring device changes during the execution of the method, compression of the medium caused by the increased second pressure is contrastingly identified. Compression of the medium caused by the pressure-boosting medium is also measured by the fill-level measuring device as a change in the fill level L→L', where L' denotes the fill level with the compressed volume. In this case, the compressed volume Vmed'(L') of the medium in the container can on the one hand first be determined and then corrected using the initially saved calibration curve to a corrected, uncompressed volume Vmed(L), and the uncompressed volume V and the uncompressed fill level L are used for calibrating, verifying and/or adjusting the fill-level measuring device. However, this compression correction is not absolutely necessary since alternatively, the compressed volume V' and the fill level L' with the compressed volume Vmed'(L') can also be used for calibrating, verifying and/or adjusting the fill-level measuring device.

With regard to the on-site calibration module, the object is achieved by a calibration module which is designed to carry out the method according to the invention for the on-site calibration of a fill-level measuring device. The on-site calibration module includes a flowmeter arranged on the inlet, a pressure gauge designed to measure the initial pressure and the increased second pressure, a temperature measuring device designed to measure the temperature in the container, and a control/evaluation unit.

In one embodiment of the on-site calibration module, the pressure gauge and/or the temperature measuring device are arranged on the inlet. Alternatively, the temperature measuring device and/or the pressure gauge can also be arranged in the container.

In a further embodiment of the on-site calibration module, the on-site calibration module is designed as a mobile on-site calibration module which can be connected in particular to a second valve unit arranged on the container. The on-site calibration module can be reversibly connected to the container via the second valve unit.

In a further embodiment of the on-site calibration module, the on-site calibration module is arranged on the container and fixedly connected to the container. For example, for a plurality of containers in the processing system, an on-site calibration module according to the invention, which comprises a fill-level measuring device, a flowmeter, a temperature measuring device and a control/evaluation unit, is provided for each container and assigned to a container that comprises a fill-level measuring device, a flowmeter, a temperature measuring device and a control/evaluation unit.

BRIEF DESCRIPTION OF THE DRAWINGS

The invention will be explained further with reference to the figures, which are not true-to-scale, wherein the same reference signs designate the same features. For reasons of clarity, or if it appears sensible for other reasons, previously-noted reference signs will not be repeated in the following figures. The following is shown.

DETAILED DESCRIPTION

Figure 1:
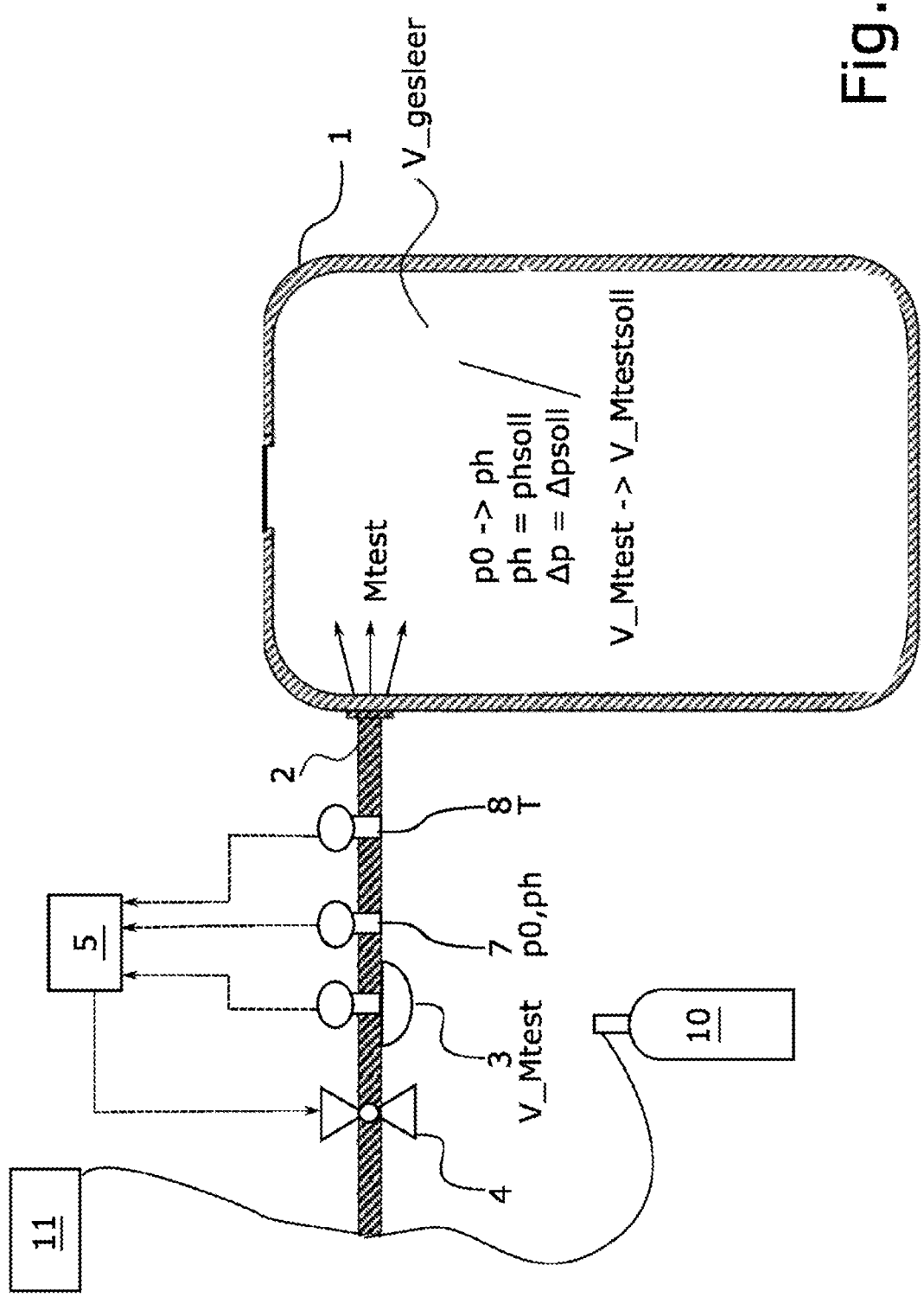
FIG. 1 shows an embodiment of the method according to the present disclosure for determining the remaining empty volume.

FIG. 1 shows an embodiment of the method according to the invention for determining the remaining empty volume V_leer. In this embodiment, the method is carried out with an empty container 1 in order to determine the entire total empty volume V_gesleer which is available in the empty container 1 for a medium and can be occupied by the medium. The total empty volume V_gesleer is ascertained once, for example initially before starting a fill-level measuring device 6 in a processing system (see FIG. 2). In this embodiment, further inlets and/or outlets of the container 1 through which for example a process medium PM or a cleaning medium RM can be supplied or discharged, and if applicable fittings present in the container 1, for example agitators or other field devices, are not shown in detail. In order to determine the remaining empty volume V_leer (in this special case, the total empty volume V_gesleer), a pressure-boosting medium Mtest flows into the container 1 via an inlet 2. The pressure-boosting medium Mtest is preferably a gaseous medium.

In this embodiment, the pressure-boosting medium Mtest is optionally purified ambient air which is introduced by means of a compressed air system 11 present in the processing system into the container 1 that is closed pressure-tight. Alternatively, for example a pressurized gas cylinder 10 containing the pressure-boosting medium Mtest is used for this. As the pressure-boosting medium Mtest flows into the container 1, the volumetric flow rate of the pressure-boosting medium Mtest through the inlet 2 is continuously determined. For this purpose, flowmeter 3, preferably a very precise Coriolis flowmeter, is used with which the volume V_Mtest of the entire pressure-boosting medium Mtest flowing into the container 1 is determined and transmitted to a control/evaluation unit 5. The control/evaluation unit 5 serves to evaluate the measured values transmitted by the measuring devices 3, 7, 8 and/or at least to regulate a valve unit 4. The valve unit 4 in this case comprises at least one valve which can be controlled by the control/evaluation unit 5 and is designed to shut off the inlet.

Before or during the inflow of the pressure-boosting medium Mtest into the container 1, the pressure p0 initially present in the container 1, or a pressure increase Δp caused by the inflow of the pressure-boosting medium Mtest and/or the increased pressure ph in the container 1, is ascertained. For this purpose, a pressure gauge 7 is arranged on the inlet 2 and transmits the measured values measured by it to the control/evaluation unit. In the case of pressure-controlled regulation, the pressure-boosting medium Mtest flows into the container 1 until a specifiable increased pressure phsoll is present in the container 1, or a specifiable pressure increase Δpsoll has been reached. When the target pressure increase Δpsoll is reached, the control/evaluation unit 5 controls the valve unit 4 in such a way that the inlet 2 is closed and no further pressure-boosting medium Mtest flows into the container 1. For this purpose, the valve unit 4 is arranged upstream of the flowmeter 3 with respect to the inflow direction of the pressure-boosting medium Mtest.

As an alternative to the pressure-controlled regulation of the method according to the invention presented here, volume-controlled regulation is possible. With the latter, the pressure-boosting medium Mtest flows in until the volume V_Mtest determined using the flowmeter 3 of the entire pressure-boosting medium Mtest flowing into the container 1 coincides with a specifiable volume.

At the same time, the temperature T present in the container is determined with a temperature measuring device 8 arranged on the inlet 2. Alternatively, the pressure gauge 7 and/or the temperature measuring device 8 can also be arranged in the container 1.

A reference pressure pn and a reference temperature Tn are then specified. The reference pressure pn and the reference temperature Tn are under normal conditions preferably an ambient pressure of 1013.25 hectopascals (hPa) or an ambient temperature of 273.15° Kelvin. The remaining empty volume V_leer is consequently ascertained from the measured volume V_Mtest of the pressure-boosting medium Mtest flowing into the container 1, the ascertained pressure increase Δp, and the measured temperature T and reference pressure pn or temperature Tn:

$$V_{leer} = V_{Mtest} \cdot \frac{T + Tn}{Tn} \cdot \frac{pn}{\Delta p + pn}$$

The total empty volume V_V_gesleer in the container is then determined as the remaining empty volume V_leer ascertained in this way with the empty container 1.

If medium (not shown) is now present in the container 1, the remaining empty volume in the container 1 is ascertained in just the same way as explained above using the method according to the invention. If there is medium in the container 1, the remaining empty volume V_leer will correspond to the negative of the volume of the medium Vmed in the container 1 up to a constant, the constant being the total empty volume V_V_gesleer described above. The volume of the medium Vmed in the container 1 can therefore be determined as follows.

Vmed=V_gesleer−V_leer

Figure 2:
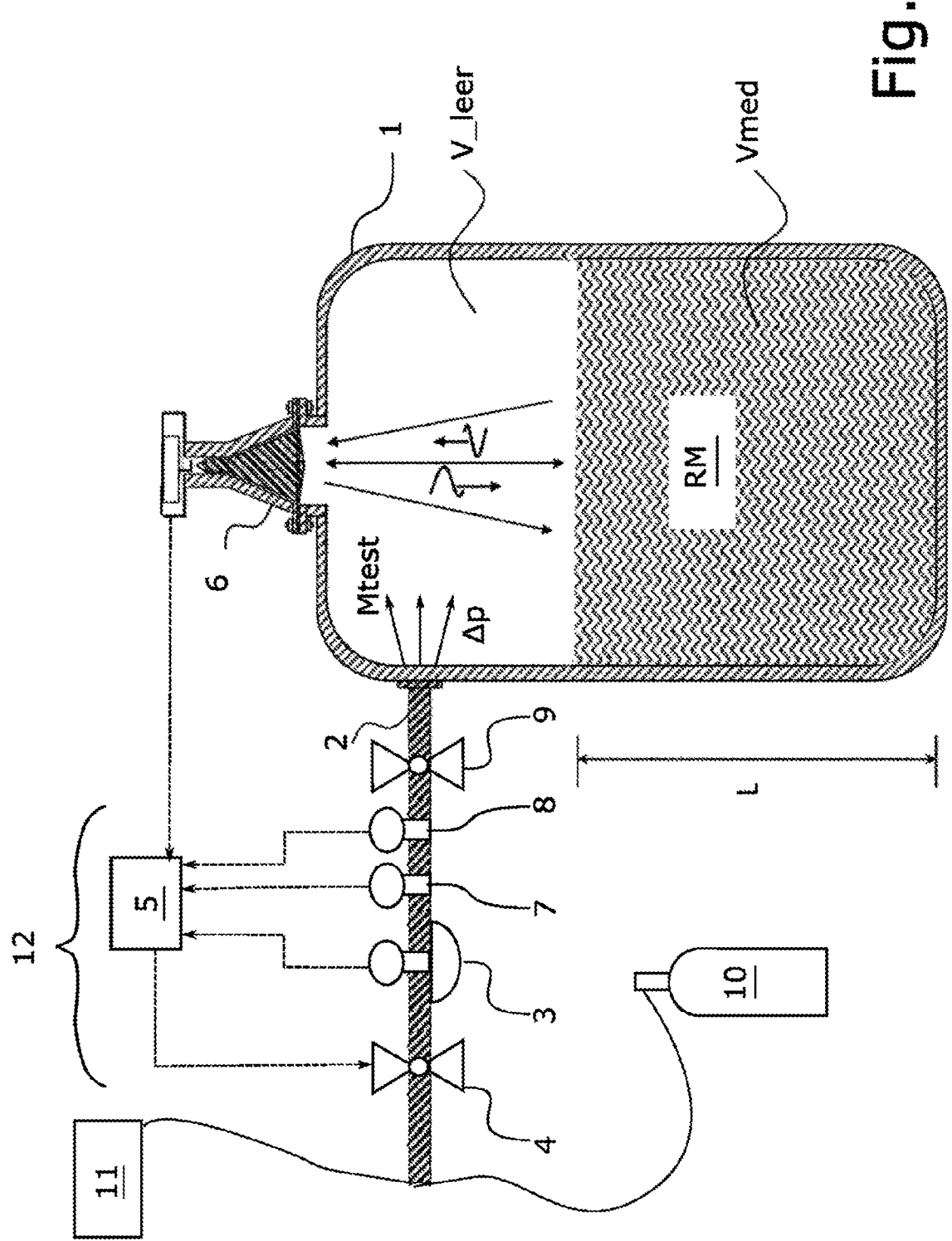
FIG. 2 shows an embodiment of the method according to the present disclosure for the on-site calibration of a fill-level measuring device, and an embodiment of the on-site calibration module according to the present disclosure.

FIG. 2 shows how the method for determining the remaining empty volume is used in a method according to the invention for the on-site calibration of a fill-level measuring device 6 or in an on-site calibration module according to the invention.

In this exemplary embodiment, the fill-level measuring device 6 is the fill-level measuring device mentioned at the outset that is based on the transit time method and operates with microwaves, wherein the invention is in no way restricted to such fill-level measuring devices as mentioned above.

The fill-level measuring device 6 serves to determine and/or monitor the fill level L of a process medium PM in the container 1.

The fill-level measuring device is initially calibrated, i.e., displays a fill level L assumed to be correct. This fill level L is correlated in the prior art with the volume Vmed of the medium in the container 1, since this is an important control or regulating variable, for example in the production of, for example, pharmaceuticals. For this purpose, a known volume of a test medium, for example high-purity WFI water, is conducted into the container, generally when starting the fill-level measuring device 6. Based on the known volume of the test medium and the fill level L indicated by the fill-level measuring device 6, and within the context of so-called linearization, a calibration curve Vmed (1) is generated with which the fill level L indicated by the fill-level measuring device 6 is converted into the volume Vmed of the medium in the container 1 in a subsequent measuring mode. Optionally even within the context of this start-up, the volume Vmed of the test medium in the container 1 is determined, as already described, using the method for determining the remaining empty volume V_leer. The volume Vmed of the test medium in the container determined by the fill-level measuring device 6 is thereby matched, or the volume Vmed of the test medium determined using the method for determining the remaining empty volume V_leer is adapted in such a way that it coincides with the volume Vmed(L) indicated by the fill-level measuring device.

In order to now calibrate, verify and/or adjust the fill-level measuring device 6 after a measuring mode, for example at set, regular intervals, the method is used to determine the remaining empty volume V_leer. For this purpose, there can advantageously be medium in the container 1 and the fill-level measuring device 6 does not have to be removed; instead the pressure-boosting medium Mtest is introduced into the container 1 with medium therein, in this case cleaning medium RM.

The volume Vmed of the medium in the container 1 is now determined once, as already described, using the method for determining the remaining empty volume V_leer and is determined once with the fill-level measuring device 6, wherein the calibration curve Vmed(L) assumed to be constant is used for the conversion.

Given the comparison described above, a deviation between the volume Vmed 1 determined using the fill level L and the volume Vmed determined using the method for determining the remaining empty volume V_leer can be attributed to a drift of the fill-level measuring device 6.

To display at least the difference between the volume Vmed determined by the fill-level measuring device 6 and the volume Vmed ascertained by the method for determining the remaining empty volume V_leer, the on-site calibration module 12 optionally comprises display means, for example a display unit connected to the control/evaluation unit 5 such as a display. Alternatively, the display can also be on a separate, optionally mobile, terminal (for example a PC, a laptop, a smartphone, a tablet, data glasses, etc.) with which the control/evaluation unit 5 communicates by means of a communication network, in particular via an field bus from automation engineering and/or via Ethernet, wirelessly and/or wirelessly.

When the fill-level measuring device 6 is adjusted, it is additionally adapted in such a way that the indicated fill level L yields a volume Vmed(L) which corresponds to the volume Vmed of the medium in the container 1 ascertained by the method for determining the remaining empty volume V_leer.

The method for the on-site calibration of the fill-level measuring device 6 is preferably integrated into existing processes in the processing system so as to minimize processing system downtime. Since, in the aforementioned industries, the process must be interrupted for regular CIP cleaning of the containers 1 in any case after the production of a so-called batch, this is a preferred point in time for the subsequent on-site calibration of the fill-level measuring device 6. For this purpose, the method with the cleaning medium RM in the container 1 and used in CIP cleaning is employed as shown in FIG. 2. Since steam-sterilization of the container 1 often takes place here after CIP cleaning, there are also basically no restrictions on the pressure-boosting medium Mtest used for this. Of course, the use of another medium instead of the cleaning medium RM, in particular the process medium PM, is also possible within the scope of the method according to the invention. Depending on the type of process medium PM, restrictions on the type of pressure-boosting medium Mtest may then result.

An on-site calibration module 12 comprises the flowmeter 6, the pressure gauge 7, the temperature measuring device 8, the valve unit 5 and the control/evaluation unit 5. This is either fixedly connected to the container or, alternatively, can be connected via a second valve unit as a mobile on-site calibration module 12 to the container 1, for example to a second valve unit 9 attached to the container 1.

The invention claimed is:

1. A method for an on-site calibration of a fill-level measuring device which is designed to determine and/or monitor a fill level of a medium in a container, wherein the fill-level measuring device operates contactlessly, the method comprising:
   determining a total empty volume in the empty container that can be occupied by the medium by:
      measuring a first pressure initially present in the empty container;
      flowing a gaseous pressure boosting medium through an inlet into the container, wherein the pressure boosting medium flowing into the container occupies the total empty volume and increases a pressure in the container from the first pressure to a second pressure;
      measuring the second pressure and determining a first pressure increase caused by the inflow of the pressure boosting medium;
      determining a first volume of the pressure boosting medium flowing into the container;
      measuring a first temperature present in the container; and
      determining the total empty volume on the basis of the first pressure increase, the first volume of the pressure boosting medium, and the first temperature;
   flowing the medium into the container;
   determining a remaining empty volume for the container by:
      measuring a third pressure present in the container;
      flowing the gaseous pressure boosting medium through the inlet into the container, wherein the pressure boosting medium flowing into the container occupies the remaining empty volume and increases the pressure in the container from the third pressure to a fourth pressure;
      measuring the fourth pressure and determining a second pressure increase caused by the inflow of the pressure boosting medium;
      determining a second volume of the pressure boosting medium flowing into the container;
      measuring a second temperature present in the container; and
      determining the remaining empty volume on the basis of the second pressure increase, the second volume of the pressure boosting medium, and the second temperature;
   determining a first volume of the medium in the container by subtracting the remaining empty volume from the total empty volume;
   measuring the fill level of the medium in the container by the fill-level measuring device;
   determining a second volume of the medium in the container by the fill-level measuring device using an initially determined relation between the fill level measured with the fill-level measuring device and a volume of the medium in the container dependent on the fill level; and
   establishing, documenting, and/or displaying at least a difference between the second volume of the medium in the container and the first volume of the medium in the container.

2. The method according to claim 1, further comprising: adjusting the fill-level measuring device, wherein the measured value of the fill-level measuring device is adapted such that the second volume of the medium in the container ascertained using the fill-level measuring device matches the first volume of the medium in the container.

3. The method according to claim 1, wherein ambient air or a gas is used as the pressure-boosting medium.

4. The method according to claim 1, wherein the gaseous pressure boosting medium flows from a pressurized gas cylinder or a compressed air system of a processing system to the inlet of the container.

5. The method according to claim 1,
   wherein the on-site calibration of the fill-level measuring device takes place after a cleaning of the container with a cleaning medium, wherein the cleaning medium serves as the medium used in the on-site calibration, and
   wherein the container is steam-sterilized after the on-site calibration of the fill-level measuring device.

* * * * *